(12) United States Patent
Dubnicki

(10) Patent No.: US 8,600,814 B2
(45) Date of Patent: Dec. 3, 2013

(54) STRUCTURED ANALYSIS AND ORGANIZATION OF DOCUMENTS ONLINE AND RELATED METHODS

(76) Inventor: Cezary Dubnicki, Warsaw (PL)

( * ) Notice: Subject to any disclaimer, the term of this patent is extended or adjusted under 35 U.S.C. 154(b) by 249 days.

(21) Appl. No.: 12/997,851

(22) PCT Filed: Aug. 28, 2010

(86) PCT No.: PCT/PL2010/000079
§ 371 (c)(1),
(2), (4) Date: Dec. 13, 2010

(87) PCT Pub. No.: WO2011/025400
PCT Pub. Date: Mar. 3, 2011

(65) Prior Publication Data
US 2011/0161168 A1    Jun. 30, 2011

Related U.S. Application Data
(60) Provisional application No. 61/238,186, filed on Aug. 30, 2009.

(51) Int. Cl.
*G06Q 30/00* (2012.01)
*G06Q 30/02* (2012.01)

(52) U.S. Cl.
CPC .................................. *G06Q 30/0276* (2013.01)
USPC ....................................................... 705/14.72

(58) Field of Classification Search
USPC ....................................................... 705/14.72
See application file for complete search history.

(56) References Cited

U.S. PATENT DOCUMENTS

| | | | |
|---|---|---|---|
| 5,819,258 A | 10/1998 | Vaithyanathan et al. | |
| 6,029,165 A * | 2/2000 | Gable | .................... 1/1 |
| 6,029,182 A * | 2/2000 | Nehab et al. | ................... 715/205 |
| 6,055,510 A | 4/2000 | Henrick et al. | |
| 6,182,050 B1 | 1/2001 | Ballard | |
| 6,327,574 B1 | 12/2001 | Kramer et al. | |
| 6,332,154 B2 * | 12/2001 | Beck et al. | .................... 709/204 |
| 6,526,275 B1 * | 2/2003 | Calvert | ......................... 455/418 |
| 6,560,578 B2 | 5/2003 | Eldering | |
| 6,622,125 B1 | 9/2003 | Cragun et al. | |
| 6,683,697 B1 * | 1/2004 | Lech et al. | .................... 358/1.15 |
| 6,711,585 B1 | 3/2004 | Copperman et al. | |
| 6,728,695 B1 * | 4/2004 | Pathria et al. | .......................... 1/1 |
| 6,889,223 B2 * | 5/2005 | Hattori et al. | .......................... 1/1 |
| 6,957,384 B2 | 10/2005 | Jeffery et al. | |
| 7,006,979 B1 * | 2/2006 | Samra et al. | ................. 705/7.28 |
| 7,246,083 B2 | 7/2007 | Bibelnieks et al. | |
| 7,725,350 B2 | 5/2010 | Schlee | |
| 8,156,001 B1 * | 4/2012 | Jing et al. | ..................... 705/14.4 |
| 2005/0022115 A1 * | 1/2005 | Baumgartner et al. | ....... 715/513 |
| 2005/0160107 A1 | 7/2005 | Liang | |
| 2005/0283470 A1 | 12/2005 | Kuntzman et al. | |
| 2006/0010035 A1 | 1/2006 | Allen et al. | |
| 2007/0124208 A1 | 5/2007 | Schachter et al. | |
| 2008/0046417 A1 | 2/2008 | Jeffery et al. | |
| 2008/0104026 A1 | 5/2008 | Koran | |
| 2009/0048928 A1 | 2/2009 | Gross | |
| 2010/0106596 A1 | 4/2010 | Grimes | |

* cited by examiner

*Primary Examiner* — James W Myhre
(74) *Attorney, Agent, or Firm* — Tutunjian & Bitetto, P.C.; David Zivan

(57) ABSTRACT

An online data storage system (100) is disclosed in which users may store a variety of personal documents in accordance with a common document structure that can include tag structures that are tailored to specific types of documents. The document and tag structures permit convenient access of the documents and enable providers of goods and services to generate targeted conditional offers while ensuring the privacy of individuals storing the documents.

20 Claims, 3 Drawing Sheets

STRUCTURED ANALYSIS AND ORGANIZATION OF DOCUMENTS ONLINE AND RELATED METHODS

RELATED APPLICATION INFORMATION

This application claims priority to U.S. provisional application Ser. No. 61/238,186 filed on Aug. 30, 2009, incorporated herein by reference.

BACKGROUND

1. Technical Field

The present invention generally relates to online document storage services and the provision of targeted advertisements.

2. Description of the Related Art

Current online storage systems available to individuals and corporations offer space for user data on the systems with a restriction merely on the size of the stored data. Indeed, such storage systems permit users to store and structure the data in any manner amenable to the user. User data in such systems are accessible with Internet browsers or with various access protocols, such as file system. Service providers of such systems ensure high availability and redundancy of the user data. Other types of online storage systems are designed to keep specialized documents and associated services. One example is Google Health (HTTP://www.google.com/health), in which individual users can store their health records and share these records securely with family members, doctors and caregivers over the Internet.

The internet has also been an important source of advertising revenue in recent years. A common form of targeted advertising is the "banner ad," which is generally selected for insertion in web pages in accordance with keyword criteria. For example, on search engine websites, advertisements that are most relevant to keywords entered by users are selected and presented to the users, with the expectation that users entering such keywords would be interested in purchasing goods or services offered by the advertisement. Similarly, web pages themselves may be parsed for keywords to select advertisements that are relevant to keywords found on the webpage for insertion into the web page. Here, the assumption is that users who are interested in the webpage would likely be interested in purchasing goods or services offered by the advertisements.

SUMMARY

Known systems for selecting targeted advertisements are limited in that the criteria on which they are based have a tenuous connection to a user's actual needs, purchasing habits or prospective needs or desires. Exemplary embodiments of the present invention provide an innovative means for determining an individual's characteristics and assessing their compatibility with advertisement criteria. For example, exemplary embodiments of the present invention can employ tag structures and/or document structures that are tailored to personal documents of users to enable advertisers to select criteria for their advertisements that is more accurate and significantly more targeted than the criteria generated in accordance with known systems.

One exemplary embodiment is directed to a data storage system for providing an online data storage service to a plurality of users. The data storage system may include a storage medium that is configured to store documents belonging to the plurality of users in accordance with a global document structure that is common to the users. The document structure can define document categories via logical storage locations such that documents with content matching given categories are referenced in logical storage locations corresponding to the given categories. The storage system may further include an offer repository that is configured to store conditional offers that are received from providers of goods and/or services and are based on tag values according to pre-defined tag structures which include tag fields that are tailored to one of the different document categories. The storage system may also comprise a tagging module that is configured to apply at least one of the tag structures to a stored document belonging to a given user if the stored document matches the category of a corresponding tag structure to extract from the stored document tag values of tag fields in the corresponding tag structure. In addition, the storage system can further include a controller that is configured to direct the deliverance of at least one of the conditional offers to the given user if the extracted tag values match a corresponding conditional offer.

An alternative exemplary embodiment is drawn towards a method for issuing conditional offers for goods and/or services. In the method, conditional offers can be received from providers of goods and/or services and can be based on tag values according to pre-defined tag structures, each of which can include tag fields that are tailored to one of a plurality of different categories of documents. Additionally, documents belonging to a plurality of different users can be stored in an online data storage system to provide a data storage service to the users. At least one of the tag structures can be applied to a stored document belonging to a given user if the stored document matches the category of a corresponding tag structure to extract from the stored document tag values of tag fields in the corresponding tag structure. Further, at least one of the conditional offers can be delivered to the given user if the extracted tag values match a corresponding conditional offer.

Another exemplary embodiment is directed to a method for issuing conditional offers for goods and/or services. The method may include storing documents belonging to a plurality of different users in an online data storage system to provide a data storage service to the users. Moreover, pre-defined tag structures that identify information about the users that is available from the stored documents can be provided to goods/services providers to permit them to generate conditional offers that are based on tag values according to the pre-defined tag structures. In addition, the stored documents can be processed to extract tag values based on the content of the documents in accordance with the pre-defined tag structures. Further, the conditional offers can be delivered to selected users having documents with tag values matching the conditional offers.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
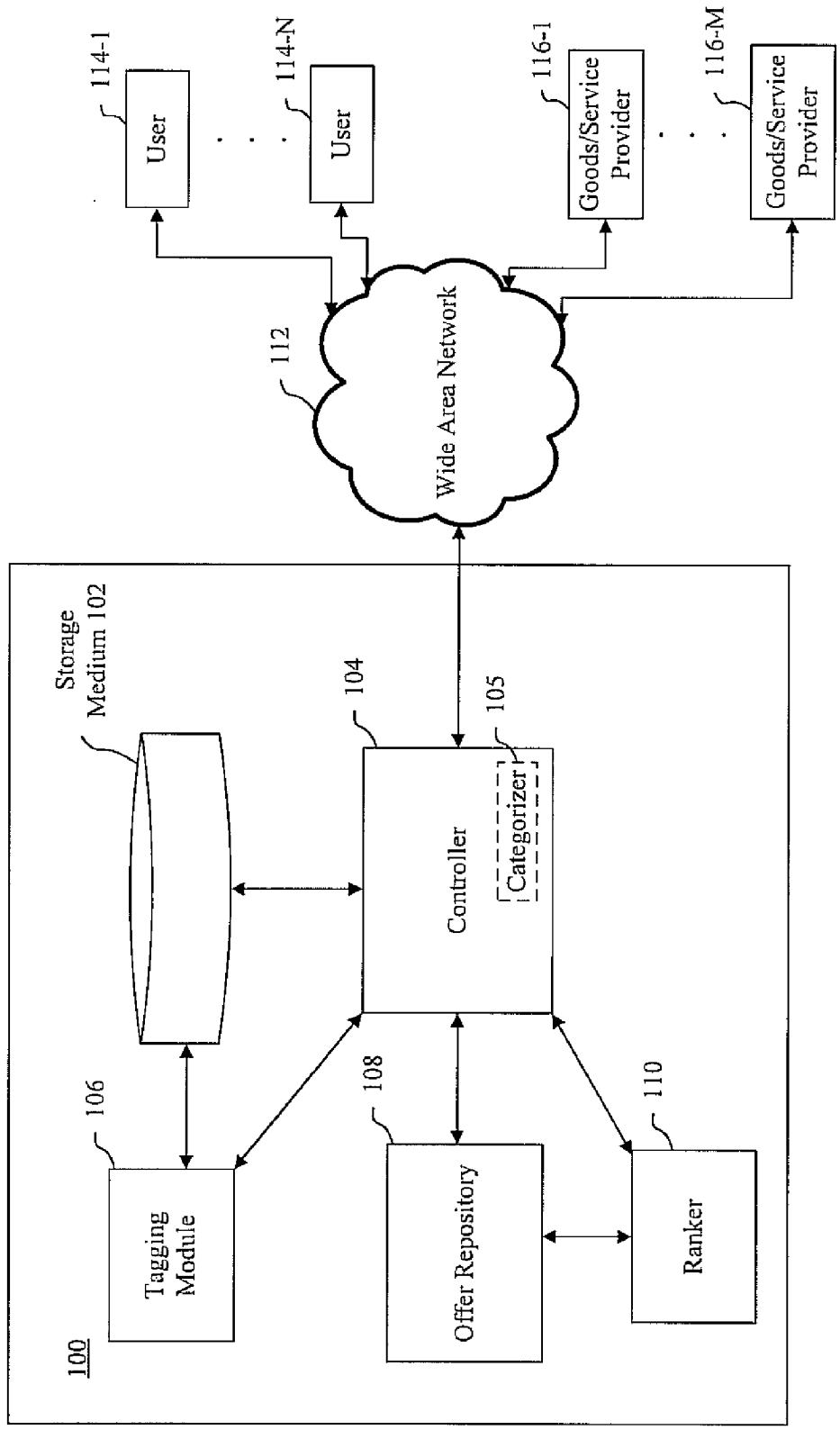
FIG. 1 is a block diagram of an exemplary embodiment of an online storage system.

Prior to discussing innovative document structures and tag structures in accordance with various exemplary embodiments of the present invention, a general description of an exemplary online storage system is provided to permit ease of understanding of aspects described herein below. With reference in detail to the figures in which like numerals represent the same or similar elements and initially to FIG. 1, an online storage system embodiment 100 is illustrated. The system 100 may include a storage medium 102 for storing documents provided by different users 114-1 to 114-N. The documents may be stored on behalf of the users by a controller 104 in accordance with a common document structure described in further detail herein below. Further, an optional categorizer 105 can analyze received documents to determine the categories within the common document structure to which the documents belong. A tagging module 106 may parse the documents in the storage medium 102 and may apply tailored tag structures, described further herein below, to extract tag values from the documents. The controller 104 may receive conditional offers from goods/service providers 116-1 to 116-M that are based on tag structures provided to the goods/service providers by the controller. The controller 104 may store the conditional offers in an offer repository 108 which, in turn, may be accessed by a ranker 110 to rank offers selected for distribution to users, as discussed further herein below. Here, the documents and conditional offers may be transmitted to the controller 104 from the users and goods/service providers, respectively, over a wide area network 112, such as the Internet. At least one or more portions of the wide area network 112 can be wireless. Documents stored in the storage medium 102 can be accessed and retrieved over the wide area network 112 using a typical browser, provided a user has rights to access existing documents and add or delete documents. Further, the controller 104 may deliver conditional offers and tag structures to users and goods/service providers, respectively, over the wide area network 112, and/or through other means of delivery, as discussed further herein below. It should be noted that "N" and "M" are simply used to illustrate that a large number of users and goods/service providers can be serviced by the storage system 100. The number of users and goods/service providers serviced are in not limited and may be varied over time.

Figure 2:
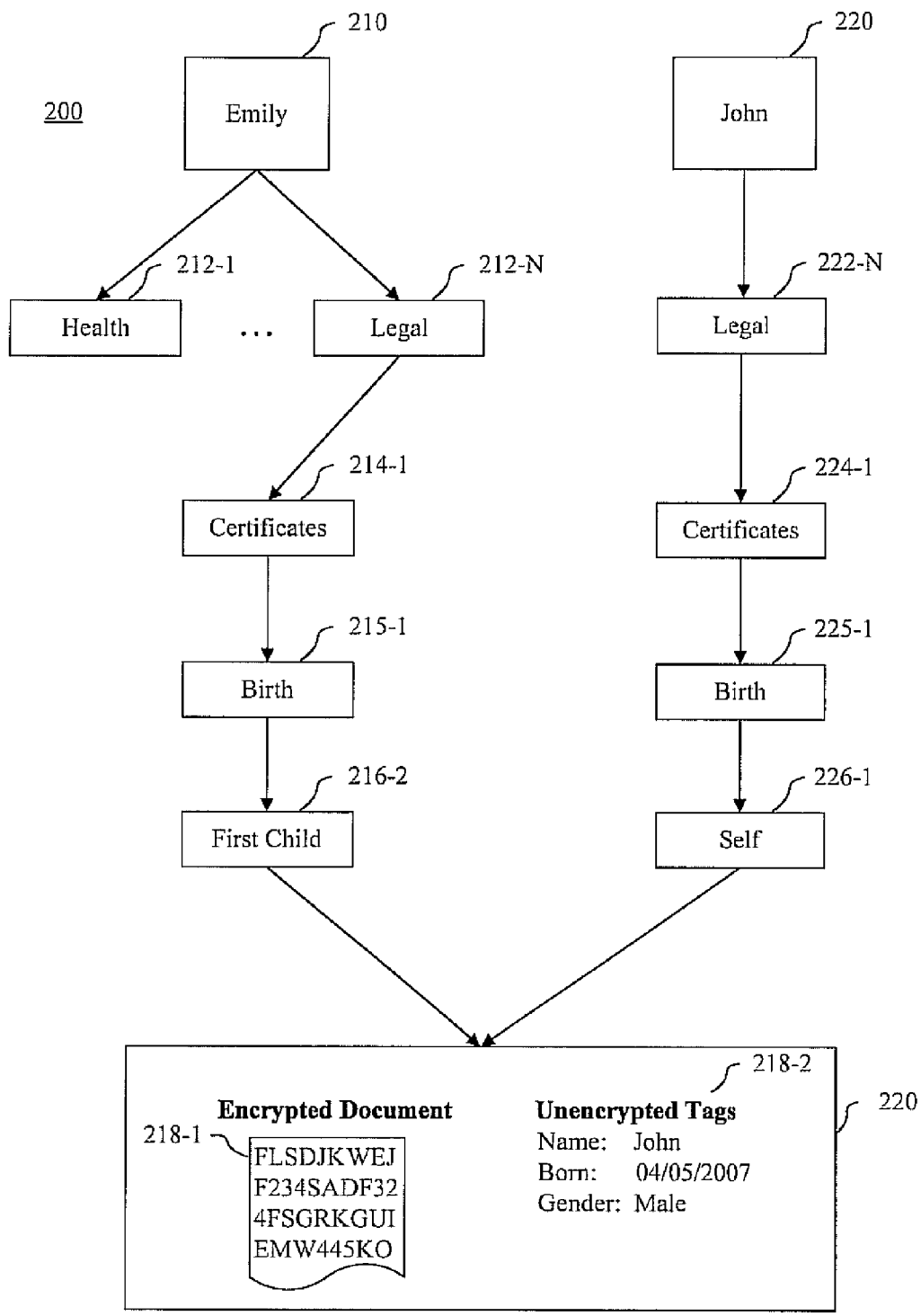
FIG. 2 is a block diagram of a portion of an exemplary document structure.

Referring now to FIG. 2, an exemplary document structure 200 in accordance with an implementation of the present invention is illustrated. The structure 200 has been simplified for ease of description and understanding. A more detailed version of a document structure is provided in Table 1 below. It should be emphasized that an important feature of structure 200 and the hierarchical document structure in Table 1 is that it is common to all users. In particular, the imposed common structure enables the precise tailoring of tag structures employed to extract information from documents concerning users and their propensity to avail themselves of goods and services that can be utilized by providers of goods and services to generate and present conditional offers.

TABLE 1

Hierarchical Structure of Documents

| Level 1 | Level 2 | Level 3 | Level 4 | Level 5 | Tags |
|---|---|---|---|---|---|
| Family | link to mother | | | | |
| | link to father | | | | |
| | children | link to 1$^{st}$ child | | | |
| | | link to 2$^{nd}$ child | | | |
| Education | high school diploma | | | | year, high-school |
| | university | 1$^{st}$ university diploma | | | year, degree, university, department |
| | | 2$^{nd}$ university diploma | . . . | | |
| | student loans | 1$^{st}$ loan | | | starting date, loan amount, loan term, interest rate |
| Legal | wills & estates | living will | | | max-length-on-support, refused-services |
| | | power of attorney | | | date executed, attorney |
| | | wills | | | date, beneficiary |
| | insurance | life insurance policy | | | date, policy term, policy limits, premiums, carrier, plan ID |
| | | health insurance policy | | | date, policy term, premiums, |

TABLE 1-continued

Hierarchical Structure of Documents

| Level 1 | Level 2 | Level 3 | Level 4 | Level 5 | Tags |
|---|---|---|---|---|---|
| | | home or building insurance | 1st home or building insurance policy | | carrier, plan ID date, policy term, policy limits, premiums, carrier, plan ID |
| | | | 2nd home or building insurance policy | ... | |
| | marriage and divorce | 1st marriage | link to spouse prenuptial agreement | | date |
| | | | marriage license | | date, institution-granting |
| | | | postnuptial agreement | | date |
| | | | divorce judgment | | date, fault-or-no-fault |
| | | 2nd marriage | ... | | |
| | certificates | birth | self | | date, location |
| | | | 1st child | | date, location |
| | | death | | | date, location |
| | driver's license | | | | height, weight, address, type |
| Property | real estate | houses | 1st house | purchase contract | purchase-price, from-whom |
| | | | | deed | location |
| | | | | home or building insurance policy | date, policy term, policy limits, premiums, carrier, plan ID |
| | | | | mortgage agreement | type, loan term in years, start-date, amount, balance |
| | | | 2nd house | ... | |
| | | plots | 1st plot | purchase contract | purchase-price, from-whom |
| | | | | deed | location, property size |
| | | | | mortgage agreement | type, loan term in years, start-date, amount, balance, interest rate |
| | | | 2nd plot | ... | |
| | automobiles | 1st auto | title | | model, model year, odometer reading |
| | | | insurance policy | | date, policy term, policy limits, premiums, carrier, plan |

TABLE 1-continued

Hierarchical Structure of Documents

| Level 1 | Level 2 | Level 3 | Level 4 | Level 5 | Tags |
|---|---|---|---|---|---|
| | | | auto loan agreement | | ID type, length start-date, amount, balance, interest rate |
| | appliances | $2^{nd}$ auto $1^{st}$ refrigerator | ... purchase receipt warranty agreement user manual | | date, price, model years |
| Hobbies | certificate of achievement | | | | date, place, domain |

According to one exemplary embodiment, the common document structure may be organized in accordance with categories such as Health, Legal, Educational, Purchase Warranties, Insurance, Taxes and so on. Each category can be further subdivided into subcategories. For example, Legal can comprise subcategories such as Property Agreements, Wills, patents, Birth Certificates, Marriage and Divorce Certificates, etc. Such a hierarchy can continue as deep as desired.

The partial document structure 200 of FIG. 2 illustrates representations of personal document structures 210, 220 allocated to user "Emily" and user "John," respectively. The document structure allocated to Emily may include categories such as health 212-1, legal 212-N and a variety of other categories in which documents belonging to user Emily have been stored. Further, the document structure allocated to user John can include a legal category 222-N, which in turn can include a certificates subcategory 224-1, a birth subcategory 225-1 and a self subcategory 226-1, denoting the birth certificate of user John. Similarly, the legal category 212-N allocated to user "Emily" also includes a certificates subcategory 214-1, which itself includes a birth subcategory 215-1 and a subcategory 216-2 for "first child." As illustrated in FIG. 2, a document may be located in multiple places in the structure if there is a logical reason for providing the document in multiple places. For example, the birth certificate 218-1 of John is accessible both through the document structure allocated to John (the person himself) and the document structure allocated to Emily (his mother).

According to one exemplary aspect, the document structure can define document categories, which can be hierarchical, via logical storage locations. For example, a document in a category may be identified with a path including the document's proper name and the names of all categories from the most general category to the most specific category, which can be similar to file names in the file system. For example, the birth certificate of the first child can be named "Legal\Certificates\Birth\First Child," as shown in FIG. 2. Further, a document may also be referenced in a plurality of logical storage locations, for example, with multiple path names, in either the same document structure allocated to a user or in different document structures allocated to different respective users. For example, as noted above, in FIG. 2, the birth certificate 218-1 of John can be located at different path names: Legal\Certificates\Birth\First Child and Legal\Certificates\Birth\Self for document structures allocated to user Emily and user John, respectively.

It should be noted that documents referenced in a plurality of different logical storage locations can be stored in a variety of ways. For example, several copies of the same document can be stored multiple times. Here, a copy of a document can be stored for each logical storage location that exists for the document. Alternatively, a single copy of the document can be stored such that there are logical links from different places in the document structure(s) to the single copy of the document. Furthermore, the controller 104 can keep a record of each possible location of the common structure in which a document can be located. To limit such records, the controller 104 can, in certain embodiments, impose the storage of a document in one location. For example, if a user's child should be born and the user wishes to store the child's birth certificate, then the controller 104 can provide the user only with an option to create another user-profile for the child to store the birth certificate, as opposed to storing the child's birth certificate in the legal documents of the parent, as shown in FIG. 2 and in Table 1. This aspect can improve processing efficiency, as the system 100 need only search one location for the document when analyzing whether a user meets the conditions of an offer, as discussed in more detail below.

As indicated above, one important aspect is that a common document structure can be allocated to and imposed on each user, or at least a subset of users, of the online storage system 100. It should be understood that the document structure is "common" in that the same type of the document for any user is located in the same place among documents of each of these users. For example, in the exemplary embodiment of a hierarchical structure of documents provided in Table 1, above, the first university degree of each user having at least one university diploma stored in the system may be located with the same path name for each such user. Thus, a common hierarchical structure of documents can be employed for each user and populated and expanded as each user stores an additional document. It should be understood that although a "common" document structure is employed for each user, each user need not have the exact same document structure, as each user will likely not store all of the same types of documents in the online storage system. As such, the "common" document structure is "global" in the sense that it denotes possible document entries that can be populated by a user. However, each user is allocated a "personal" document structure that can vary from user to user and that is populated and structured according to the "global" document structure. As discussed in more detail below, each personal document structure can be defined by a user-name at the beginning of any logical path to a document belonging to the user.

It should also be understood that the hierarchical structure of documents provided in Table 1 is only exemplary and other document structures can be utilized. Any of a variety of documents describing a user's life (or at least one particular aspect of it) and describing past events as well as future, planned and scheduled events can be incorporated into a document structure. In addition, the document structure need not be hierarchical and need not be structured by path names, as described above. The structure can be organized in a variety of ways. For example, the structure can be organized by document groups, where a given document can belong to one or more groups and each group can denote a different, defined document type or category. Here, each type or group can have its own defined tag structure and associated tags. Additionally, defined relationships between document groups can exist Further, it should be noted that the document structure provided in Table 1 is for one individual user with links to other users' structures. Moreover, the document structure categories provided in Table 1 are generalized and only a few tag structures, described in more detail below, are employed to permit ease of understanding.

The exemplary hierarchical document structure in Table 1 includes five possible hierarchical levels, with categories denoted by family, education, legal, properties and hobbies at the first level. The family category here has links to family members' document structures, such as a link to a mother and father, which are on the second level of the structure, and links to document structures of children. It should be noted that certain categories can be expanded as needed. For example, the "children" category under "family" can be expanded to include additional links to children as documents for additional children are stored in the online storage system 100. Here, the links may be employed to gather additional information about a user, as needed, for issuing conditional offers if conditional offer criteria is dependent on family members, as discussed further herein below. Moreover, the links to parents and children can be established or determined manually, for example, by permitting a user to identify parents or children. Alternatively, the links to parents and children can be established or determined automatically by the controller 104 based on information in documents stored in the system 100, such as a birth certificate or tax records identifying the parents or children of a user.

As illustrated in Table 1, the education category can include a high school diploma for the user as a stored document on the second level. In addition, under the subcategory of university, one or more university diplomas can be stored. Similarly, one or more documents for student loans can be included in the education category. The legal category can include a subcategory for wills & estates, which, in turn, may include various documents, such as living wills, power of attorneys, and wills. Other legal categories can include insurance, which may include life insurance policies, health insurance policies, etc. Marriage and divorce can also be included in the legal category, which may include subcategories for each marriage of a user. For one particular marriage subcategory, a link to the corresponding spouse may be provided and determined, for example, based on documents stored in the marriage subcategory, such as a marriage license, a prenuptial agreement, a postnuptial agreement and a divorce judgment. Another legal category can include certificates, which, in turn, may include documents such as a birth certificate and a death certificate. The legal category can further include a driver's license among other documents.

As provided in Table 1, another important level 1 category can be "property," which may include subcategories such as "real estate," "automobiles" and "appliances." The real estate category may include a category for "houses," which in turn may include one or more subcategories for documents related to different houses owned by the user. Each house category can include documents such as a purchase contract, a deed, a home or building insurance policy and a mortgage agreement. Another real estate category may include plots, which, in turn, may include documents such as a purchase contract, a deed and a mortgage agreement. The automobile category may include subcategories for various automobiles owned by the user. For example, for one automobile owned by the user, documents such as a title, an insurance policy and an auto loan agreement can be stored. The appliances category can include a purchase receipt, a warranty agreement and a user manual. It should be noted that the hierarchical document structure may include other categories such as "hobbies," which may, in turn, include documents such as a certificate of achievement.

It should be noted that certain categories can be enumerated as many times as needed to store corresponding documents. For example, a second or third house category can be added under "property\real estate\houses" when a document for the second or third house is stored in the system. In addition, tag structures, discussed in more detail below, for each low-level category instance, such as $1^{st}$ house, $2^{nd}$ house etc., can be identical. Furthermore, some information need not to be stored explicitly but instead can be inferred from the common document structure. For example, as noted above, siblings or children of a given user can be identified from stored documents, such as tax records. Of course, the common hierarchical document structure can be extended. For example, the common structure may include documents that are more sensitive to privacy, such as tax records, bank account records, health records, etc.

A structure for a given user may keep additional information about the user, including height and weight, which may change over time, in addition to links to parents, siblings, current and former spouses and children, as discussed above. As indicated in Table 1, such links can be also named in a standardized way, for example "First Child" always points to structure of the first child, if it exists. In addition, dedicated documents can be generated and stored by the controller 104 in the storage medium 102 for each user indicating details that change over time. For example, the controller 104 can generate a physical characteristics document and can either request from the user details of the user's physical characteristics or can determine such physical characteristics insofar as possible from the user's stored documents, including medical records, etc. The controller 104 may further store multiple versions of such dedicated documents with a time-defined order.

Other properties of the common document structure is that, in addition to enabling a user to insert a document manually, documents can also be added automatically upon its generation using appropriate procedures. For example, when the first child's birth certificate is issued, the birth certificate can be automatically encrypted with a public key of each of the parents and then mailed to the system to keep in the structure of each parent. Moreover, with digital signatures in place, original documents can be stored in the system 100 and can be automatically inserted in the system 100 by the institutions issuing them. For example, upon graduation, a university may automatically insert the original university diploma into a document structure of the student. Other possible properties include configuring, either by the storage system 100 or by a user, one or more documents to be read-only in that the one or more documents are not modified in their lifetime. Here, multiple versions of a document can exist in the system with appropriate version identifiers associated with the versions of the document.

In addition to providing security and convenient access to a user's personal documents, the online storage system 100 can utilize the common document structure to provide a variety of other benefits to its users. For example, based on the document structure allocated to users, users can easily assemble documentation for various purposes such as collecting the requisite documents to obtain financial loans and mortgages, to generate an up-to-date curriculum vitae (CV), to supplement an employment application, and for many other purposes. The system may additionally have built-in support to automate such procedures. For example, the online storage system 100 may store standard loan applications from various banks in the storage medium 102 and, upon a user-request to compile documents for a loan application, the controller 104 can be configured to compile requisite documents for the loan application, such as bank statements, income statements from an employer, property deeds, etc. Further, the controller 104 can be further configured to automatically fill out portions or all of an application based on the stored documents. For example, the controller 104 can retrieve a name, address and annual income from tax records by extracting tag values of tag structures, as discussed further herein below, and present the completed or substantially or partially completed application to the user for his or her review.

Other benefits of the storage system 100 can include support of sharing of stored documents with other users and institutions. For example, a document owner may be able to grant to another user, and/or revoke, an access right to read, modify or delete a specific document or category. Such rights can be implemented with public-key cryptography by making copies of the affected documents encrypted with public key of a user who obtains these rights, or by passing a document-specific encryption key. In certain exemplary embodiments, the documents can be stored as read-only with special procedures to correct mistakes and add more content. Besides reading rights, there may be different rights that can be granted by a user, such as, for example, a right to search tags of all documents of a given category. Tag structures are described in more detail below.

Another benefit of common document structures described herein is the automatic generation of a family or genealogical tree, prediction of likelihood of various illnesses based on medical history of ancestors, etc., by using linking information provided in a user's document structure. Further, the document structure can be utilized by employers to recruit professionals based on education, experience and geographic location. For example, employers can structure a notification of an employment position in the same manner as providers of goods and services structure and issue conditional offers described herein. Here, an employer can peruse the tag structures for the global document structure and specify particular tag values of the tag structures for one or more documents as a condition for the system 100 to issue and forward the notification of the employment position to users who have documents with tag values matching those specified by the employer. In addition, as discussed in more detail below, the system 100 can provide services for verifying the documents of its users. For example, if an applicant submits a CV stating that the applicant has a certain university degree, the employer can contact the controller 104, identify the applicant and request verification that the applicant has a valid university degree. In turn, the controller 104 can find the applicant's document structure, locate the respective user's university degree in the structure and determine whether the degree has a digital signature from the corresponding university. The digital signature can be indicated in a tag value of a tag field. If so, the controller 104 can transmit a verification to the employer that the applicant does indeed have the university degree. Here, to maintain the user's privacy, the controller 104 can transmit to the user a request to send the verification to the employer, in response to which the controller 104 can transmit the verification. Alternatively, if the user employs the system's CV generation services, the verification can be provided automatically in the generated CV document.

Moreover, common document structures described herein can permit any authorized institution and/or individual to easily locate a specific standard document related to another individual (such as the first child birth certificate). This feature may be beneficial to, for example, an executor compiling the records of a deceased user. The common document structure provides a significant advantage over systems that employ no imposed structure, where the location of needed documents is difficult or even impossible to determine, resulting often in lost and inaccessible documents. This is especially true when a person who has not stored the document attempts to locate it. In addition, the common document structures described herein enable the content of stored documents to be easily available for processing, and, in particular, automated processing.

Figure 3:
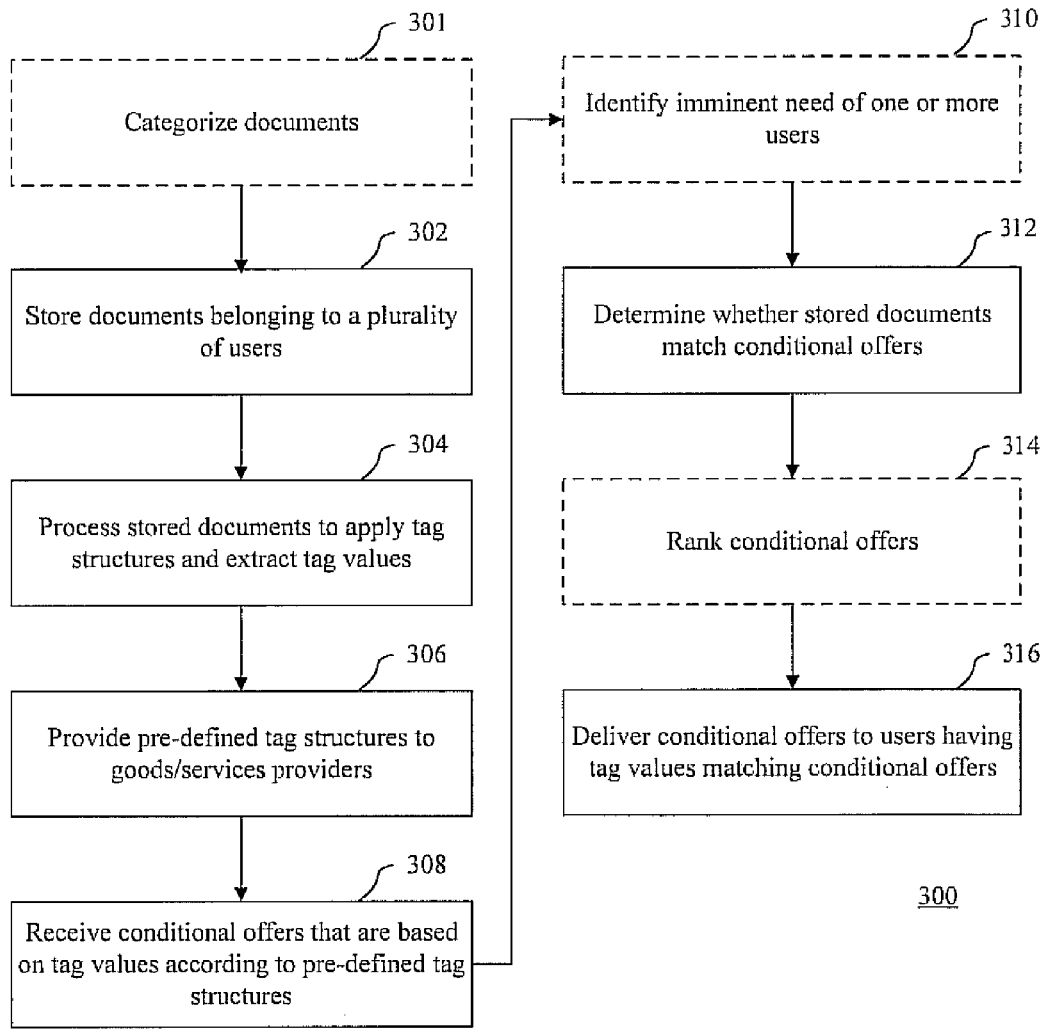
FIG. 3 is a block/flow diagram of an exemplary embodiment of a method for managing documents in an online storage system.

With reference now to FIG. 3 with continuing reference to FIGS. 1 and 2, a method 300 for managing documents in accordance with an exemplary embodiment is illustrated. It should be understood that method 300 can be performed by the online data storage system 100 described above. In addition, all aspects discussed above with regard to exemplary embodiments can be implemented within the method 300. The method 300 can begin at step 302, in which the controller 104 may store documents belonging to a plurality of users. For example, one or more users may either manually store documents or they may be automatically stored through various entities, as discussed above. In addition, a common hierarchical document structure described above can be employed to store each user's documents, as described at length above. For example, as discussed above, the common document structure can define hierarchical document categories via logical storage locations. For example, the category for the birth certificate for the first child can be defined by the logical storage location "user_ID\legal\certificates\birth\first child."

Further, documents with content matching given categories can be stored in storage locations corresponding to the given categories. For example, as indicated above with respect to Table 1, a first child's birth certificate matches the category legal\certificates\birth\first child and may be stored under the path "legal\certificates\birth\first child" while a first university diploma matches the category education\university\$1^{st}$_university_ diploma and may be stored under the path "education\university\$1^{st}$_ university_ diploma."

Moreover, one or more stored documents belonging to a user can belong to different categories and the controller 104 can logically store such documents in a plurality of different logical storage locations defining the different categories. For example, as discussed above with regard to FIG. 2, the document belonging to user John can be stored in the logical storage location "Emily\Legal\Certificates\Birth\ First Child" and the logical storage location "John\Legal\Certificates\Birth\Self." As another example, the different storage locations may be allocated to the same user. For example, in accordance with Table 1, a first home insurance policy of user Emily can be stored in both the logical storage location of "Emily\legal\insurance\ home_or_building_insurance\ 1st_home_or_building_insurance_policy" and the logical storage location of "Emily\property\real_estate\houses\1st_house\home_or_building_insurance_policy."

Furthermore, each user can be allocated a personal document structure in the storage medium 102 such that documents sharing a common type and belonging to different users are logically stored or referenced in the storage medium with an identical path name under corresponding personal document structures allocated to the users to which the documents belong. For example, with reference again to FIG. 2, the user Emily can be allocated a personal document structure defined by "Emily\ . . . " while the user John can be allocated a personal document structure defined by "John\ . . . " In addition, documents sharing a common type, such as birth certificates of users, can be stored under an identical path under the users' corresponding personal document structures. For example, again with reference to FIG. 2, the birth certificate of the user Emily can be stored under the path "Emily\Legal\Certificates\Birth\First Child" while the birth certificate of the user John can be stored under the path "John\Legal\Certificates\Birth\Self." Of course, the user identifier defining the personal document structure at or near the beginning of a path can be more complex to ensure that the user identifier is unique to each user. For example, the online storage system may permit a user to select a user identifier and prompt the user to select another identifier if the initially selected identifier is already employed by another user. Alternatively, the user can select an identifier of her choosing for user-viewing purposes and the system 100 can internally employ a unique identifier, such as a social security number, for the user to denote the personal storage structure of the user.

It should be noted that in accordance with various exemplary aspects, a document can be categorized by a user storing the document. For example, the controller 104 of the online data storage system 100 can be configured to present one or more of the users 114-1 with the common document structure, or at least a portion of the common document structure, applied to documents stored in the storage medium 102. For example, the controller 104 can be configured to present the user with the hierarchical structure of documents provided in Table 1. In turn, the user can select the corresponding category of the document and the document can be stored under the selected category. Alternatively or additionally, the controller 104 can be configured to process the document and determine its category automatically.

For example, optionally, at step 301, the categorizer 105 in the controller 104 can categorize received documents prior to storing the documents in accordance with the common document structure. The optional categorizer 105 can be configured to analyze received documents to determine the documents' appropriate places within the common document structure. According to exemplary aspects, the categorization of a document can be semi-automatic, wherein the system supports categorization with occasional user input. Further, the action of the categorizer 105 can depend on the document format. In the most general case, a submitted document can be generated from a paper copy by scanning. After submission, the categorizer 105 can process the submitted document using optical character recognition (OCR) software, which can be part of the system 100. Such processing will generate machine-encoded text. Alternatively, a document may be submitted directly in a machine-encoded text format. Once a document is in the format of machine-encoded text, the categorizer 105 can scan the document for keywords and phrases. Using these findings and their locations in the document, the categorizer 105 can match the document with one or more locations in the common document structure, effectively assigning a submitted document to one or more document types. As indicated above, a document type or document category can be, for example, a driver's license, a marriage certificate, a real property title, etc. In addition, each location proposed by the categorizer 105 can be presented to the user and explicitly accepted, rejected or changed by the document owner manually. Moreover, the categorizer 105 can record such manual selections to train itself and thereby improve its classification accuracy so that the classification will over time be highly accurate.

It should be noted that, if a document cannot be classified because the document structure is insufficient, the system 100 may permit the document owner to submit a request for a document structure extension to the system 100. Such an extension can be global in that it is visible to all other users in the same way to ensure a common structure for all users, as described above.

The original form of each document can be in computer-generated binary-key signed form, wherein the classification can be trivial, as each such document type can have one or more locations in the document structure that is defined as a document type property. Similarly, the location of tag fields, their names and types can be properties of the document type as well.

At step 304, the tagging module 106 can process stored documents to apply tag structures and to extract tag values from the documents. For example, the controller 104 may receive a document from a user, or other entity on behalf of a user, and can process the document prior to storage in the storage medium as discussed above with respect to step 302. Alternatively, the document can be processed after or as it is stored in accordance with step 302.

Here, each tag structure applied to the documents can be tailored to each low or high level document category. For example, a tag structure can be applied to any one or more of the levels 1-5 in Table 1. Thus, the tagging module 106 can be configured to apply at least one of the tag structures to a stored document belonging to a user if the stored document matches the category of a corresponding tag structure to extract from the stored document tag values of tag fields in the corresponding tag structure. For example, as indicated in Table 1, the controller 104 can apply a tag structure to insurance policy categories under the legal category that can include fields for the date of the policy, the policy term in years or months, the policy limits, the premiums to be paid, the carrier of the policy, and the plan identifier (ID). Further, the structure can be tailored to each policy category and can include other tags, such as "beneficiary" for the life insurance policy, the property location for the home or building insurance policy, etc. In addition, for a different category, such as the mortgage agreement under the category of property\real_estate\houses\1st house, the corresponding tag structure can include the loan type, the loan term in years, the starting date of the loan, the loan amount, the loan balance and the interest rate.

Accordingly, at step 304, the tagging module 106 can apply a tag structure to a document in a corresponding category, as defined, for example, by Table 1, to extract tag values of tag fields in the tag structure based on the content of the document. For example, for the tag structure assigned to the category of property\real estate\houses\1st house, the tag values extracted from the mortgage agreement can include: fixed mortgage (for loan type), 30 years (for the loan term in years), May 30, 1999 (for the starting date of the loan), $300,000 (for the loan amount), 4.84% (for the interest rate), etc.

In accordance with one exemplary aspect, for each document type or category in the common document structure, the system 100 owner or administrator can define tag fields. For each field, the system 100 owner or administrator can provide a tag name and the tag's type, which can be denoted by number, date and string. The system 100 owner or administrator can further provide an acceptable range for the tag value. For example, the range can be a number between 10 and a current age. Additionally, for each tag, the system 100 owner or administrator can define information for the system 100 that facilitates the extraction of the value of the corresponding tag field. For example, the system 100 owner or administrator may specify a prefix string after which a given tag is most likely to be identified. For an address tag field, the prefix can be "Address." For example, each time the prefix or keyword is found in a document of a specific type or category to which the tag field is assigned, the information following the prefix or keyword is likely the value of the address tag and can be employed as such by the tagging module 106 to extract the tag value from the document. The process can be further facilitated if the document is in a fixed, known format. For example, a New Jersey Driver's License is a standardized document with a fixed format, and the system 100 owner or administrator may specify approximately at which offset in a document representing a machine-encoded NJ Driver's License values of specific tags can be found. Since OCR may not be completely accurate, the offset can be an approximation. Moreover, tag extraction may at times involve manual intervention by a user to correct errors. It should be noted that in accordance with exemplary aspects, complete accuracy of extracted tag values may not be necessary. For example, a high level of accuracy can be guaranteed to providers of goods and services that is less than 100%. Such levels can be verified by an independent auditor and can be specified by a service-level agreement (SLA) between the system 100 owner and the providers of goods/services.

FIG. 2 provides an example of a tag structure and tag values extracted from a birth certificate. In accordance with one exemplary aspect, a document, such as a birth certificate, can be stored as an entity 220 that includes the document 218-1, which can be encrypted, and a set 218-2 of tag values or tag values with the corresponding tag structure. Alternatively, the tag values or tag values with the corresponding tag structure can be stored in the storage medium 102 by the tagging module 106 in a table that is accessible by the controller 104. It should also be noted that some tag fields may be left undefined and the system 100 is capable of continuing operation as described herein.

The exemplary hierarchical structure of documents of Table 1 provides a variety of other examples of tag structures that may be applied to documents stored or to be stored in the storage medium 102 to extract corresponding tag values as discussed above. For example, a tag structure for the high school diploma under the education category can include tag fields for year and high school, while the tag structure for the university diploma categories can include year, degree (B.S., B.A., etc.), university and department. In addition, for the student loan category, the tag structure may include fields for the starting date of the loan, the loan amount, the loan term, the interest rate, the bank issuing the loan, etc. Table 1 provides examples of tag structures applied to many other different categories. However, it should be understood that the categories and the tag structures are merely exemplary and that other or additional sets of categories and corresponding tag structures can be employed. It should also be understood that the classification of documents in accordance with the document structure and the extraction of tag values may be, but is not required to be, fully automatic.

One important aspect is that the common document structure can be provided to goods/service providers to permit the generation of highly precise and targeted offers. Thus, at step 306, the controller 104 can provide a set of pre-defined tag structures to goods/service providers. For example, the tag structure illustrated in Table 1 can be provided to goods/service providers. It is important to note that providers of services and goods need not have access to values of tags of documents; it is sufficient if they are readable only by the system 100 and the document owner. The providers need only know the structure of tags to issue conditional offers based on values of these tags (similar to SQL query) that is known to be obtainable by the storage system 100 via the provided tag structures in a corresponding common document structure. Furthermore, because each structure is specifically tailored to a document category of a wide variety of personal documents, the goods/service providers can construct conditional offers based upon highly precise information, while at the same time, the privacy of users can be protected.

For example, an offer can be based on qualifications for the goods/services, which, in turn, can be determined from documents stored by the user or directed to be stored by user. Here, the offer may be provided to satisfy an imminent need of the user. For example, if a draft of a contract for the purchase of a home is stored by a user in the system 100 and detected by the system 100, then the system 100 can identify an imminent need of the user for a home mortgage, as discussed in more detail below with respect to step 310. Banks may employ the common document structure to construct precise conditional offers for the user based on the tag structures provided therein. Rather than basing the provision of an offer on a determination of whether an individual is qualified to receive an advertisement for services, which may be based on user-interest determined from conventional internet searches, etc., the bank can provision an offer based on qualifications to receive the services referenced in the offer, thereby rendering the offer more meaningful and appealing to a user.

For example, a bank may use the document structure and associated tag structures to assess what information may be available from the storage system and may, in turn, specify the conditions of the offer based on the tag structures. For example, the bank may a offer a range of mortgage amounts and an interest rate and may specify conditions for the offer that can include one or more of the following: an estimate of the value of the home, an estimate of the total assets held by the purchaser(s), an estimate of the total income received by the purchaser(s), an estimate of current expenses and obligations of the purchaser(s), regularity of bill payments made by the purchaser(s) and a credit score of the user(s). Here, the estimate of the value of the home can be based on the purchase value in the purchase contract or even on an estimate stored in the seller's documents in the system 100 for the address of the home, where the seller's name and address can be obtained from the stored purchase contract. Similarly, the estimate of the total assets held by the purchaser(s) can be based on bank records, deeds, automobile titles, etc., which are stored in the system 100 on behalf of the user and which belong to different categories in the document structure. Moreover, an estimate of the total income received by the purchaser(s) can be based on the user's bank statements or tax records stored in the system 100 on behalf of the user. Further, an estimate of current expenses and obligations of the purchaser(s) can be based on loan agreements, bank statements, tax records and bill records stored in the system 100 on behalf of the user while the regularity of bill payments by the purchaser(s) can also be based on bank statements and bill records. In addition, a credit score of the user can be based on credit reports stored by the user in the system 100. The bank may further condition the offer on a user's willingness to swear to the veracity of the documents stored in the system and/or on the bank's confirmation that the data therein is true, which would provide similar security to the bank that it would otherwise have through a conventional application process. The confirmation of the veracity of the documents can be facilitated by the controller 104 of the system 100. For example, the controller 104 can authenticate documents on behalf of the bank or can provide the bank proof of authentication by employing digital signatures from institutions issuing the documents. For example, a consumer credit reporting agency can apply a digital signature to a credit report stored in the system 100.

As such, precise qualifications for complex offers of services can be pre-determined and based on a variety of different documents in different document categories using specific information obtainable via tag structures that are tailored to the different categories in the common document structure. Such offers permit goods/service providers to target users with as much specificity as they wish, ensuring that they are personalized to users that can actually receive the goods and services. In turn, users are much more likely to avail themselves of the offers provided through the system 100. For example, users in the mortgage example provided above can be guaranteed to receive the loan amount and the interest rate offered without having to manually compile the requisite documentation and receive an offer from bank using a conventional application process, which can often take several weeks to complete. By using the online data storage system 100, users can automatically receive reliable mortgage offers within minutes of storing a purchase contract and need not expend any significant effort in securing a mortgage. Furthermore, a user's privacy can be completely protected, as the goods/services providers need not have access to actual tag values to construct conditional offers. For example, the goods/services providers can have access to only the tag structures of the common document structure. The tag structure can be provided with semantical definitions of field names and categories.

In another example, insurance companies can automatically provide competing offers that are tailored to insure a specific car of a specific user if there is an automobile insurance policy about to expire. Similar to the mortgage example, an offer can be based on qualifications for a user to receive an offer that can be provided to satisfy an imminent need of the user. Here, the qualification criteria can be based on documents stored by the user or directed to be stored by user. For example, the insurance company may provide the storage system 100 with an offer that is based on automobile information, such as make, model and year of an automobile, which can be obtained from a stored title for the automobile. Other information on which the offer can be based can include the number of family members a person has (which can be based on birth certificates or tax records stored in the user's document structure), whether the person is married (which can be based on marriage certificates), the number of cars owned and insured by a user (which can be based on automobile titles and auto insurance policies that are stored in the user's document structure) and any other requisite qualifications (or ranges of qualifications) that permit the insurance carrier to specify the precise policy limits and premium amounts for an individual's automobile in the offer. Further, the offer can be conditioned on final confirmation of the veracity of the stored documents and/or the veracity of the information in the stored documents, as described above with respect to the mortgage example.

According to another example, goods providers may issue offers to supply a large new refrigerator. For example, the criteria of the offer may be an individual that is part of a larger family, which owns only one small and old refrigerator. The size of a person's family may be based on a tag structure allocated to an individual's tax return or birth certificate records, while the size of the refrigerator can be determined from a tag structure allocated to warranty documents.

In addition, it should also be noted that the system 100 can model offers provided by goods/services providers as logical expressions including tag fields from the pre-defined tag structures provided in the common document structure. Using the refrigerator offer as an example, an offer modeled as a logical expression can comprise the following:

if (House.size>=3000 sq feet) AND (House.age<5 years) AND (FORALL Refrigerators EACH Refrigerator.volume<200 liters) THEN details of an offer of sufficiently large refrigerator with a discounted price.

In this logical expression, House.size, House.age and Refrigerator.volume are tag fields with values that can be extracted from various documents of an individual user, such as a home deed and refrigerator warranties. Accordingly, conditions of an offer can be based on semantic values automatically extracted from documents. Moreover, any one or more of the conditions can be determined from one or more document categories in the common document structure.

It should be understood that a multitude of conditional offers can be constructed by goods/services providers using tag structures allocated to one or more documents stored in one or more user's document structure. Below is a short list of examples of advanced queries that are based on conditional offers and that can be applied by the system 100 to user-documents stored in the system to determine which users are qualified for conditional offers:

For each young individual who has an outstanding high-interest auto loan and who has at least one parent who owns a home with high equity, issue an offer for a low-interest refinancing for this auto loan that is secured by this parent's home equity.

For each person, who has young children (within some specified range of ages), who has a large mortgage balance and who has no life insurance policy, issue an offer of life insurance tailored for such people.

For each person with substantial assets who has died recently without a will, issue an offer of legal services to all people who may have a claim in the deceased's estate, such as the deceased's children, and current and former spouses of the deceased.

For each young person in the third year of study at a university with a pre-law major, as indicated by educational records, issue an offer of a book and/or service directed to tips on taking the Law School Admission Test (LSAT).

For each person who is single and is interested in playing tennis (as indicated by one or more certificates of achievement), issue an offer for a tennis camp for singles which will take place in the Bahamas when the camp is in operation.

Consolidated auto insurance: For an extended family, such as parents, grandparents, children (one or more of whom have documents stored in the storage system 100), with at least some members using a particular insurance company's auto insurance policy, and with many automobiles in possession (within some specified range of a number of automobiles) by individuals in the extended family, issue a consolidated auto insurance offer with 10% discount if all family members switch their insurance to the insurance company.

In another example, publishers of books and newspapers may issue conditional offers to read or purchase a given book/newspaper story to users who are likely interested in it. In addition, the system 100 can be useful to attorneys conducting a class action lawsuit. For example, an attorney can utilize the system 100 to identify whether any users are members or potential members of a class using the tag structures, as discussed above. In turn, for users that are identified as members or potential members of the class, the system 100 may issue a notification or a request to join the class to such users on behalf of the attorney.

It should be noted that offers need not be limited to tag values belonging to a single user. For example, one conditional offer can be directed to an educational computer game which requires high computing power and is expensive. Such an offer may be directed to a parent, as opposed to a child, as the child may not have enough money to purchase the game or may not appreciate its educational value. For example, the conditions of the offer can include that a given user has a son aged 7 to 10 and this given user or this boy owns a powerful laptop/computer. Here, the conditional offer uses tags from multiple users (parent and son) but is delivered to the parent. For example, the birth certificate of the son may be located in the son's personal document structure, while a warranty for the computer may be located in the parent's document structure, or vice versa. Thus, conditional offers may be based on tag values from documents belonging to a plurality of users.

Further, it should be noted that the system 100 can provide a goods/services provider with options related to undefined fields. For example, for each tag field in an offer's logical expression, the goods/services provider can insert a pre-defined flag, indicating that the given tag field need not be defined for a match. Alternatively, the flag can indicate or a different flag that can be inserted by the provider can indicate that a given tag field must be defined for a match.

At step 308, the controller 104 may receive conditional offers from any one or more of goods/services providers 116-1 to 116-M over the network 112. The conditional offers can be constructed and formulated as discussed above, for example, with respect to step 306. In this way, based on stored documents (and their associated tags if they exist), service and goods providers may compete for the business of users owning these documents. As indicated above, the conditions of an offer can be based on potential tag field values of tag structures in the common document structure and on user characteristics. In addition, the controller 104 can format the conditional offers as logical expressions, as discussed above, and can store the conditional offers in the offer repository 108.

Optionally, at step 310, the controller 104 can identify that a good and/or service is imminently needed by a given user based on tag values stemming from different documents in different categories. For example, as discussed above, the controller 104 can determine that an auto insurance policy is imminently needed by detecting that a current auto insurance policy will expire within, for example, one month. The expiration date of the policy may be extracted directly from the policy based on a tag structure allocated to insurance policies or may be determined indirectly based on an issue date and a policy term extracted from the policy in accordance with a tag structure allocated to insurance policies. Similarly, the controller 104 can determine that a cellular telephone contract is imminently needed by detecting that a current cellular telephone contract will expire within some imminent time period.

In addition, as discussed above with regard to the conditional offer example for a mortgage, the controller 104 can determine that a mortgage is imminently needed by a user by detecting that a real property purchase agreement has been stored in the user's assigned document structure. It should be noted that the subject of a conditional offer eventually delivered to a user, for example, at step 316, discussed herein below, can be for the imminently needed good or service identified at step 310. Further, if an imminent need is identified by the controller 104, the identification can prompt the performance of step 312, described in more detail below, in which the controller 104 can determine whether stored documents match the conditional offer. For example, providers of goods and services can specify an expiration date on an offer. Thus, if an imminent need is identified for a given user, then the controller 104 may search the repository 108 for offers directed to the good/service needed by the user that are unexpired and may determine whether the given user satisfies the conditions of such offers, as described below with respect to step 312.

At step 312, the controller 104 can determine whether documents stored in the storage medium 102 on behalf of users match the conditional offers received from goods/services providers. For example, as indicated above, for the conditional offers, goods/services providers can specify tag values of various tag structures applied to documents in one or more categories in a user's document structure. In turn, here, at step 312, the controller 104 can determine whether tag values extracted from a user's documents at step 304 match the tag values specified for one or more conditional offers. If a user's documents match the tag values specified for one or more conditional offers, then the method may proceed to step 314 or step 316. Thus, the system 100 can automatically select individuals with document tags matching a conditional offer and deliver this offer to these individuals. As indicated above with respect to the construction of conditional offers, the extracted tag values that match a conditional offer can be extracted from a plurality of different documents in different categories stored in the storage system that belong to a given user.

It should be noted that step 312 can be based on logical expressions, as indicated above. Further, the queries listed above can be applied at step 312 to determine whether matches to conditional offers can be found. Moreover, the controller 104 can be configured to search for matches to a conditional offer in accordance with step 312 upon receiving the conditional offer from the goods/service provider. Alternatively or additionally, the controller 104 can perform step 312 periodically as new conditional offers and/or new user-documents are received.

At step 314, the ranker 110 can compile and rank conditional offers from different providers for a selected user having documents with tag values matching the ranked conditional offers. For example, the ranker may rank a plurality of offers for the same good or service, or the same type of good or service, that match a user's document tag values and may select only the best offers for delivery to the user, with the most competitive or beneficial offer for the user provided first and the other offers provided thereafter in descending order of competitiveness or benefit. The ranking function can also employ logical expressions, as described above, in addition to tag structures. Further, the ranker 110 may initially employ a default ranking procedure for each user prior to customization of a ranking function. For example, the system 100 can permit users to interact with the controller 104 over the network 112 and thereby customize an offer-comparing function for each type of service and good to prioritize comparison of features based on user-preferences. Users may receive N best offers (where N is settable by user) specific to a given document prioritized by a ranking function. In this way, a ranking function can be customized by a user to express more accurately his or her preferences and priorities. As such, user experience can be improved, as the user can automatically receive the best offers and can be assured that his identity can remain hidden from goods/service providers.

At step 316, the controller 104 can deliver at least one of the conditional offers to a user if the tag values extracted from documents belonging to a user match a corresponding conditional offer. The offer delivery can be executed in a variety of ways. For example, the controller 104 can deliver the offer to the user by email, short message service (SMS), telephone call, world wide web (WWW) links among other means of delivery. Offers can also be grouped in the document structure of a given user associated with a given document or document category and can be ranked as described above. Users may also specify a preferred way of receiving competing offers, as well as an expiration policy of these offers. Thus, the controller 104 can deliver offers in accordance with such received user-preferences.

Other preferences that a user may specify and that a controller 104 may institute is a restriction on the type of offers that can be delivered to the user. If information is restricted to one type, for example, "insurance offer," only offers related to insurance can be delivered to the user at step 316. For each document, a user may have a choice between a continuum of options between total privacy and total openness. In one extreme, with total privacy, all documents stored in the system on behalf of a user can be encrypted with a user-key that is kept outside of the system, and no tagging is supplied by a user nor can tags be extracted by the system. In this scenario, the system cannot decrypt such documents because it does not possess the user-key. In another extreme, documents can be stored in the storage medium 102 in a form that is readable by the system 100, which can extract tags from them. Here, the user can supply additional tags as needed or desired. There are also a multitude of in-between solutions. For example, one such solution is storing an encrypted document with readable tags, which can permit for alert services (described further herein below), offer bidding and other tag-based services. FIG. 2 provides an example of this solution in which a document 218-1 is encrypted and has associated therewith readable, unencrypted tags 218-2. There are also many options for document encryption that can be instituted. For example, the stored documents can be encrypted with one user-specific key, or each document may have its own specific encryption key, which can, in turn, be encrypted with a user-specific key.

Further, as discussed above, only tag structures can be initially provided to goods/services providers to permit them to generate conditional offers while maintaining a user's privacy. However, a user-acceptance of an offer can implicitly reveal to the goods/services provider that the user has documents with tag values matching the conditional offer. Thus, with each conditional offer, the controller 104 can provide the user with a listing of tag values matching the respective conditional offer. A warning can be provided indicating that, upon acceptance of the conditional offer, the goods/services provider can deduce the information in the tag values. Alternatively, the controller 104 can provide the listing of tag values and/or the warning in response to receiving from the user a request for the listing. Alternatively or additionally, the controller 104 can maintain the anonymity of the user throughout the transaction. For example, the system 100 can be configured such that it acts as an intermediary between the goods/services provider and the user such that the system 100 receives payment for the goods/services in the accepted offer and relays the goods/services from the provider to the user and the funds from the user to the goods/services provider, to the extent possible. In addition, according to one exemplary aspect, personal information about the user can be provided to the goods/services provider in extenuating circumstances, such as in response to a court order.

Moreover, it should be noted that the online storage system 100 can be configured to have a variety of other features that can benefit its users. For example, based on the common document structure and document content retrieved automatically or with user-provided tagging or some other structured data provided by users, automatic online processing of the documents is possible to permit the provision of new services such as automatic alerts to users about a need to perform specific actions in addition to automatic collection of competing offers for services and goods needed by a particular individual. Here, the system 100 can issue various alerts and notifications to a user based on values of document tags, user characteristics and other user-supplied data. Such user-supplied data can include need description records described below and a family/relationship structure embedded in a document structure. For example, the family/relationship structure can be denoted by links to children, brothers, sisters, parents, etc. Based on stored documents and, if they exist, their associated tags, a system may automatically alert users about a need to perform specific actions. For example, such actions can include extending an expiring automobile insurance policy or notifying a user to obtain a new contract on a cellular telephone service before a current contract expires. In another example, a user may indicate in a need description record that he wants to purchase a truck for his business within the next three months. Here, the system can send a notification alerting the user that there is a special tax break for truckers that expires in one month and that the user should expedite the purchase to utilize this tax break. Another alert may notify a user to prepare for a celebration of his parents' 25th anniversary of marriage that will pass within a month. The controller 104 can obtain the parents' 25th anniversary date from a marriage certificate stored in a parent's personal document structure. These alerts can be issued in many different ways, for example by email or telephone call, or any of the other various manners discussed above with regard to step 316 of FIG. 3.

The system 100 may also include other beneficial features for the user. For example, the storage services can be provided to users free of charge if the user views N offers (for example 10) each time the user logs on to the system 100. Further, the system 100 can be configured such that the user is not required to view more than M (for example, 50) offers in a week to retain the free services. This aspect provides a fairness attribute for users that logon multiple times in one week. In this situation, the user need not click through N offers each time the user logs on.

Figure 4:
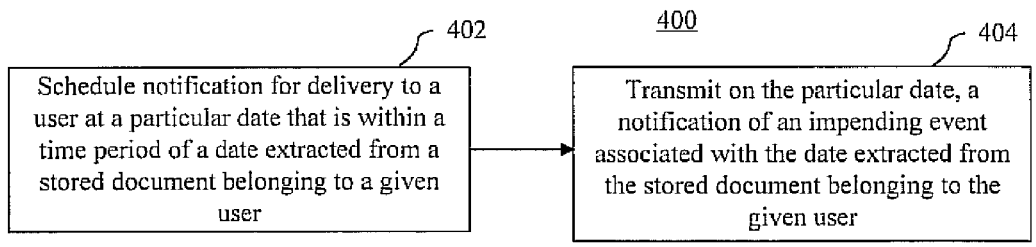
FIG. 4 is a block/flow diagram of an exemplary embodiment of a method for generating and delivering notifications of impending events.

With reference now to FIG. 4, with continuing reference to FIGS. 1 and 3, a method 400 for providing automatic alerts to users in accordance with an exemplary embodiment is illustrated. It should be understood that method 400 can be combined with method 300 discussed above and can be performed by the controller 104 of the system 100. Method 400 can begin at step 402, in which the controller 104 can schedule a notification for delivery to a user at a particular date that is within a time period of a date extracted from one or more stored documents belonging to the user. For example, with regard to the automobile insurance policy example provided above, a tag structure for the automobile policy may include a tag field for a policy termination date. Alternatively, the policy termination date can be determined indirectly, as discussed above. Thus, an auto insurance policy can be processed at step 304, as described above, to extract the tag value for the policy termination date. Further, the controller 104 can schedule a notification to be delivered at a particular date that is, for example, one month before the policy termination date. At step 404, the controller 104 can transmit, on the particular date, a notification of an impending event associated with the date extracted from the stored document belonging to the given user. For example, the impending event may be the termination of the auto insurance policy.

Other possible features that can be implemented within the online storage system 100 include need description records, as indicated above. For example, independently of tags associated with stored documents, users may be able to create need description records, each of which can describe a user's need for a good or service. Such descriptions may use predefined tags, their values and logical operations. Providers of goods and services may deliver conditional offers matching these needs. For example, a user may describe a need for 42-inch plasma television with high density resolution and at least four high density multimedia interface (HDMI) slots, and television set providers may deliver their offers based on such specifications. Alternatively, the user may provide a need description record detailing a need for a mortgage. Here, the need description records can be stored in the storage medium 102 and can be associated with a user's document structure. In turn, the storage system 100 can transmit need description records of users to goods/services providers, which in turn can issue offers based on the need description records and can be based on tag values, as discussed above with regard to step 304, if the need description records do not indicate sufficient information to make the offer. Furthermore, the controller 104 can provide the user with those offers that match corresponding tag values of a user's documents, as discussed above with respect to method 300. The offers can be delivered directly by the goods/services providers (for example, if the need description records are sufficient to issue the offer) or can be delivered to the user by the system 100.

Other aspects that can be implemented in the system 100 can include providing guidance to users in specific situations, generating a plan of action in response to a user request and soliciting offers based on the user-request. For example, the system 100 may include general rules that can be selectively enabled/disabled by users. These rules can provide guidance in specific situations and provide or prompt a specific set of actions and offers. For example, such rules can detect the storage of a real property purchase contract and, in response to the detection, can suggest post-purchase steps to a user and provide associated offers. For example, post-purchase steps can include obtaining a mortgage on a home, obtaining an insurance policy on a home, etc. In turn, the controller 104 can obtain, match and deliver conditional offers for such steps, for example for mortgages, insurance policies, etc., for example, as discussed above with respect to method 300.

Although the description provided above concerns systems that store documents of individuals, similar systems can be built for corporations. While it is difficult to provide a common document structure for all corporations, each corporation service can be restricted to specific types of documents. Such types of documents can be, for example, those documents related to the procurement of insurance. Further, automatic bidding can be provided by service and goods providers based on analysis of these documents, as discussed above with respect to 304-316.

In accordance with exemplary embodiments of the present invention described herein, tag structures and/or hierarchical document structures that are tailored to an individual's personal documents can be employed to determine highly detailed and accurate information about the individual and thereby enable advertisers to select criteria for their targeted advertisements. Furthermore, embodiments also provide information about an individual with a degree of specificity that can enable advertisers to pre-qualify individuals for complex and selective offers for services. Moreover, these advantages can be provided while completely maintaining an individual's privacy.

It should be understood that embodiments described herein, such as system 100, may be entirely hardware, entirely software or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Having described preferred embodiments of systems and methods (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims.

Having thus described aspects of the invention, with the details and particularity required by the patent laws, what is claimed and desired protected by Letters Patent is set forth in the appended claims:

1. A data storage system for providing an online data storage service to a plurality of users comprising:
    at least one hardware storage element that is configured to store documents belonging to the plurality of users in accordance with a global document structure that is common to the users, said document structure defining different document categories via logical storage locations, wherein documents with content matching given categories of the document categories are referenced in logical storage locations corresponding to the given categories, wherein the at least one hardware storage element includes an offer repository and stores conditional offers that are received from providers of at least one of goods or services and are based on pre-defined tag structures, wherein each of the pre-defined tag structures includes tag fields that are tailored to one of the different document categories; and at least one hardware processor configured to implement a tagging module, which, when implemented by the at least one hardware processor, applies at least one given tag structure of the pre-defined tag structures to a stored document belonging to a given user of the plurality of users if the stored document matches the category of the given tag structure to extract from the stored document tag values of tag fields in the given tag structure, wherein the at least one hardware processor is configured to implement a controller, which, when implemented by the at least one hardware processor, provides the providers of at least one of goods or services with the pre-defined tag structures, including the corresponding tag fields of the pre-defined tag structures, and directs the deliverance of at least one given conditional offer of the conditional offers to the given user if the extracted tag values match the given conditional offer.

2. The data storage system of claim 1, further comprising:
a ranker configured to compile and rank conditional offers from different providers for a selected user having documents with tag values matching the ranked conditional offers.

3. The data storage system of claim 1, wherein each conditional offer is modeled as a logical expression including tag fields from the pre-defined tag structures.

4. The data storage system of claim 1, wherein the extracted tag values that match the given conditional offer are extracted from a plurality of different documents in different categories stored in the storage system that belong to the given user.

5. The data storage system of claim 1, wherein the at least one given conditional offer includes a particular conditional offer that is based on tag values of documents belonging to at least two of the plurality of users and wherein the particular conditional offer is delivered to the given user if tag values extracted from the at least one stored document belonging to the given user and from at least one stored document belonging to a different user of the plurality of users match the particular conditional offer.

6. The data storage system of claim 1, wherein the controller is further configured to, when implemented by the at least one hardware processor, provide the providers of at least one of goods or services with the document structure and the pre-defined tag structures without any tag value of at least one field of at least one of the pre-defined tag structures.

7. The data storage system of claim 6, wherein the controller, when implemented by the at least one hardware processor, is further configured to receive, from at least one of the providers of at least one of goods or services, the given conditional offer with tag values of the at least one field of at least one of the pre-defined tag structures and to match the extracted tag values to the tag values received in the given conditional offer.

8. The data storage system of claim 1, wherein at least one of the documents belonging to the given user belongs to different categories of at least a subset of said document categories and is referenced in a plurality of different logical storage locations defining the different categories of the at least a subset of said document categories.

9. The data storage system of claim 1, wherein each user is allocated a personal document structure in said storage medium such that documents sharing a common category and belonging to different users are logically stored in the storage medium with an identical path name under corresponding personal document structures allocated to the users to which the documents sharing the common category belong.

10. A method for issuing conditional offers for at least one of goods or services comprising:
providing providers of at least one of goods or services with pre-defined tag structures to permit the providers to generate conditional offers, wherein each of the pre-defined tag structures includes tag fields that are tailored to one of a plurality of different document categories;
receiving, from the providers of at least one of goods or services, conditional offers that are based on tag the pre-defined tag structures;
storing documents belonging to a plurality of different users in an online data storage system to provide a data storage service to the users;
applying, by at least one hardware processor, at least one given tag structure of the pre-defined tag structures to a stored document belonging to a given user of the plurality of users if the stored document matches the category of the given tag structure to extract from the stored document tag values of tag fields in the given tag structure; and
delivering at least one given conditional offer of the conditional offers to the given user if the extracted tag values match the given conditional offer.

11. The method of claim 10, wherein the storing further comprises storing the documents in accordance with an imposed document structure that is common to the plurality of users to categorize the documents and wherein the providing further comprises providing the providers of at least one of goods or services with the document structure.

12. The method of claim 10, wherein the providing further comprises providing the providers of at least one of goods or services with the pre-defined tag structures without any tag value of at least one field of at least one of the pre-defined tag structures.

13. The method of claim 12, wherein the providing is implemented by the at least one hardware processor and wherein the method further comprises:
receiving, from at least one of the providers of at least one of goods or services, the given conditional offer with tag values of the at least one field of at least one of the pre-defined tag structures; and
matching, by the at least one hardware processor, the extracted tag values to the tag values received in the given conditional offer.

14. The method of claim 10, wherein at least one of the extracted tag values is a date and wherein the method further comprises:
scheduling a notification for delivery to the given user at a particular date that is within a time period of the date extracted from the stored document belonging to the given user; and
transmitting, on the particular date, a notification of an impending event associated with the date extracted from the stored document belonging to the given user.

15. The method of claim 14, wherein the extracted tag values that match the given conditional offer are extracted from a plurality of different documents in different categories of at least a subset of said document categories stored in the storage system that belong to the given user.

16. The method of claim 10, wherein the conditional offers are based on tag values, of tag fields of said pre-defined tag structures, that define user-qualification criteria for the conditional offers.

17. The method of claim 10, further comprising:
compiling and ranking conditional offers from different providers for a selected user having documents with tag values matching the ranked conditional offers.

18. The method of claim 10, wherein the extracted tag values are concealed from the providers.

19. The method of claim 10, further comprising:
identifying that at least one of the goods or services is imminently needed by the given user based on tag values stemming from different documents in different categories, wherein the subject of the conditional offer delivered to the given user is the imminently needed good or service.

20. A method for issuing conditional offers for at least one of goods or services comprising:

storing documents belonging to a plurality of different users in an online data storage system to provide a data storage service to the users;

providing pre-defined tag structures that identify information about the users that is available from the stored documents to providers of at least one of goods or services, wherein each of the pre-defined tag structures includes tag fields that are tailored to one of a plurality of different document categories;

receiving, from the providers, conditional offers that include tag values of at least a subset of the tag fields of the pre-defined tag structures;

processing, by at least one hardware processor, the stored documents to extract tag values in accordance with the pre-defined tag structures from the documents stored in the online data storage system on behalf of the users, wherein the extracted tag values are based on the content of the documents; and delivering the conditional offers to selected users having documents with tag values matching the conditional offers.

\* \* \* \* \*